(12) United States Patent
Fornage et al.

(10) Patent No.: US 11,709,461 B2
(45) Date of Patent: Jul. 25, 2023

(54) METHOD AND APPARATUS FOR CONTROLLING POWER BASED ON PREDICTED WEATHER EVENTS

(71) Applicant: Enphase Energy, Inc., Petaluma, CA (US)

(72) Inventors: Martin Fornage, Petaluma, CA (US); Benjamin Smith, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 17/404,177

(22) Filed: Aug. 17, 2021

(65) Prior Publication Data

US 2021/0382443 A1 Dec. 9, 2021

Related U.S. Application Data

(63) Continuation of application No. 14/505,268, filed on Oct. 2, 2014, now abandoned.

(60) Provisional application No. 61/885,737, filed on Oct. 2, 2013.

(51) Int. Cl.
  *G05B 13/02* (2006.01)
  *H04L 67/1001* (2022.01)

(52) U.S. Cl.
  CPC ........ *G05B 13/026* (2013.01); *H04L 67/1001* (2022.05)

(58) Field of Classification Search
  None
  See application file for complete search history.

(56) References Cited

U.S. PATENT DOCUMENTS

| | | | | |
|---|---|---|---|---|
| 4,971,136 A | * | 11/1990 | Mathur | H02J 3/14 |
| | | | | 165/262 |
| 8,373,303 B1 | | 2/2013 | Daniels et al. | |
| 10,309,994 B2 | * | 6/2019 | Hoff | G01W 1/02 |
| 2001/0008718 A1 | * | 7/2001 | Kobayashi | H01M 8/04626 |
| | | | | 429/61 |
| 2010/0204844 A1 | | 8/2010 | Rettger et al. | |
| 2010/0292857 A1 | * | 11/2010 | Bose | H02J 13/00002 |
| | | | | 702/62 |

(Continued)

FOREIGN PATENT DOCUMENTS

| | | |
|---|---|---|
| JP | 2009060704 A | 3/2009 |
| JP | 2012010489 A | 1/2012 |

(Continued)

OTHER PUBLICATIONS

Katiraei et al., "Transients of a Micro-Grid System with Multiple Distributed Energy Resources ", IEEE, 2005, 6pg. (Year: 2005).*

(Continued)

*Primary Examiner* — Ryan D. Coyer
(74) *Attorney, Agent, or Firm* — Moser Taboada

(57) ABSTRACT

A method and apparatus for controlling power production. In one embodiment, the method comprises determining a predicted weather event; determining a predicted power production impact for a distributed generator (DG) array based on the predicted weather event; and controlling power production from one or more components of the DG array to compensate for the predicted power production impact.

20 Claims, 4 Drawing Sheets

(56) References Cited

U.S. PATENT DOCUMENTS

| | | | | |
|---|---|---|---|---|
| 2011/0148205 A1* | 6/2011 | Moon | ................... | H02J 9/062 |
| | | | | 307/65 |
| 2011/0282514 A1* | 11/2011 | Ropp | ................... | H02J 3/004 |
| | | | | 700/297 |
| 2012/0089660 A1 | 4/2012 | Smith et al. | | |
| 2012/0205977 A1 | 8/2012 | Shin et al. | | |
| 2013/0041516 A1* | 2/2013 | Rockenfeller | ............ | H02J 7/34 |
| | | | | 700/287 |
| 2013/0166090 A1* | 6/2013 | Ren | ................. | H02J 13/00017 |
| | | | | 700/297 |
| 2013/0184884 A1 | 7/2013 | More et al. | | |
| 2013/0221802 A1* | 8/2013 | Oh | ...................... | H02N 2/181 |
| | | | | 310/319 |
| 2014/0077595 A1* | 3/2014 | Kakuya | ............... | H02J 7/0024 |
| | | | | 307/24 |

FOREIGN PATENT DOCUMENTS

| | | |
|---|---|---|
| JP | 2012010536 A | 1/2012 |
| KR | 101223711 B1 | 1/2013 |

OTHER PUBLICATIONS

Hoff et al., "PV Power Output Variability: Correlation Coefficients", Clean Power Research, pp. 1-23, Nov. 11, 2010.
Stewart et al., "CSI RD&D Small Grant Proposal", Lawrence Berkeley National Laboratory, pp. 1-5, Sep. 23, 2013.
PCT Search Report And Written Opinion, PCT/US2014/058876, 12 pages, dated Jan. 14, 2015.
Ktiraei et al., "Transients of a Micro-Grib System with Multiple Distributed Energy Resources", IEEE, 2005, 6pg.

* cited by examiner

METHOD AND APPARATUS FOR CONTROLLING POWER BASED ON PREDICTED WEATHER EVENTS

CROSS-REFERENCE TO RELATED APPLICATION

This application is a continuation application of U.S. patent application Ser. No. 14/505,268, filed on Oct. 2, 2014, which claims the benefit of and priority to U.S. Provisional Patent Application No. 61/885,737 filed on Oct. 2, 2013, the entire content of each of these application is incorporated herein by reference.

BACKGROUND OF THE INVENTION

Field of the Invention

Embodiments of the present disclosure relate generally to power production and, more particularly, to controlling power production based on predicted weather events.

Description of the Related Art

Distributed generators (DGs) generate power using one or more types of renewable resources as inputs. DGs may be subject to degraded levels of input power from these renewable resources due to events such as weather events; for example, wind turbines are affected by reduced levels of wind, and photovoltaic (PV) modules are affected by shading events such as cloud coverage. Sudden changes in input power levels may cause DG output power changes that exceed ramp rates required by utility companies.

For large scale DG installations, energy storage is generally used to compensate for degradations in input power by storing energy when power is sufficiently produced by the DG and supplementing power generated by the DG when needed (e.g., to smooth power ramp-up and ramp-down). Economics of such large scale installations are frequently driven by the cost of the necessary energy storage as well as the lifetime of the storage systems.

Therefore, there is a need in the art for a method and apparatus for efficiently generating power in a DG.

SUMMARY OF THE INVENTION

Embodiments of the present invention generally relate to an apparatus and system for controlling power production substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
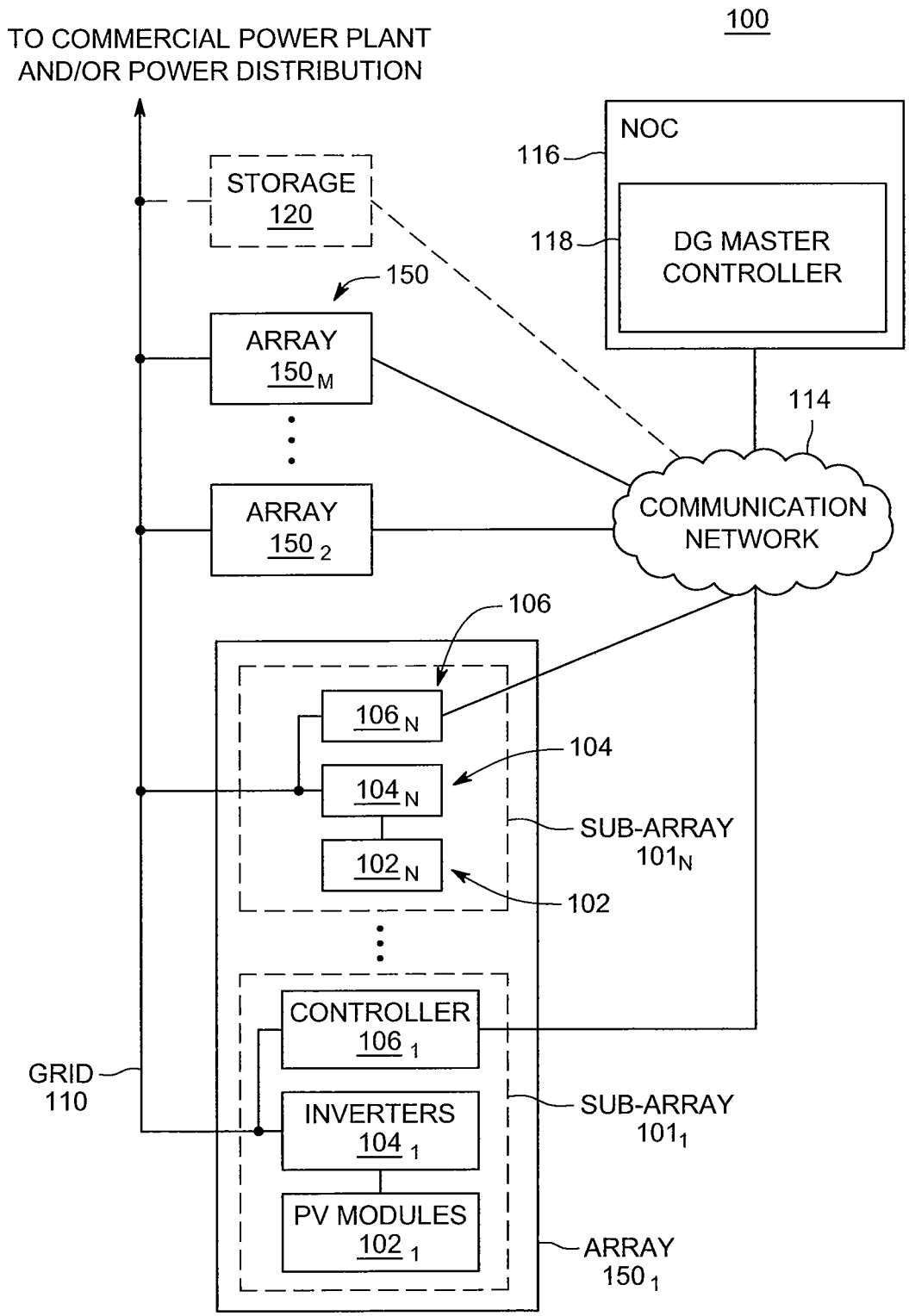
FIG. 1 is a block diagram of a system for generating power in accordance with one or more embodiments of the present invention.

FIG. 1 is a block diagram of a distributed generator (DG) system 100 for generating power in accordance with one or more embodiments of the present invention. This diagram only portrays one variation of the myriad of possible system configurations. The present invention can function in a variety of distributed power generation environments and systems.

The system 100 comprises a plurality or DG arrays $150_1$, $150_2$, ..., $150_M$, collectively referred to as arrays 150. Each array 150 comprises a plurality of DG sub-arrays $101_1$ ... $101_n$, collectively referred to as sub-arrays 101, although the number of sub-arrays 101 may differ from array to array. The arrays 150 may all be owned by a single owner, or alternatively different owners may each own one or more of the arrays 150. Similarly, sub-arrays 101 within an array 150 may all be owned by a single owner or different owners may each own one or more sub-arrays 101.

Each sub-array 101 comprises a plurality of inverters $104_1$, $104_2$, ... $104_n$ (collectively referred to as inverters 104) coupled to a plurality of photovoltaic (PV) modules 104) coupled to a plurality of photovoltaic (PV) modules $102_1$, $102_2$, ... $102_n$ (collectively referred to as PV modules 102) in a one-to-one correspondence (i.e., one inverter per PV module). The plurality of inverters 104 is further coupled to an AC power grid distribution system ("grid") 110, for example via a load center (not pictured). The inverters 104 convert DC power from the PV modules to AC power and couple the generated AC power coupled to the grid 110. In some embodiments, the arrays 150 may generate total power on the order of 1-200 megawatts (MW). In one or more alternative embodiments, DC-DC power converters may be used in place of the inverters 104 and the resulting DC output may be coupled to a DC distribution line. For example, in one or more of such embodiments, DC power from one or more sub-arrays 101 may be coupled via a DC line to a single centralized DC-AC inverter, where the output from the DC-AC inverter is coupled to the grid 110.

Each sub-array $101_1$, $101_2$, ... $101_n$ further comprises a controller $106_1$, $106_2$, ... $106_n$ (collectively referred to as controllers 106) coupled to the grid 110. The controller 106 (e.g., a gateway) obtains data from and issues commands/controls to the corresponding inverters 104 within its sub-array 101 via power line communications, although in other embodiments other types of wired communications and/or wireless communications may be used. In certain embodiments, the number of inverters 104 within a sub-array 101 may be on the order of 500 inverters, although in other embodiments the number may be fewer or more; for example, each sub-array 101 may comprise a single inverter 104 coupled to one or more PV modules 102. Each controller 106 may contain (or have coupled to it) a monitor for determining current power production from the corresponding sub-array 101.

The system 100 further comprises a communications network 114 and a Network Operations Center (NOC) 116. The communications network 114 may comprise dedicated cables, wireless networks, LANs, WANs, the Internet, and the like, and communicatively couples the controllers 106 and the NOC 116. The NOC 116 comprises a DG master controller 118 that is also communicatively coupled to the controllers 106 via the communications network 114 for communicating with the corresponding sub-arrays 101 (e.g., for sending control commands to one or more of the sub-arrays 101, for receiving performance data from one or more of the sub-arrays 101, and the like). In some alternative embodiments the DG master controller 118 may be separate from the NOC 116.

In accordance with one or more embodiments of the present invention, the DG master controller 118 controls power generated by one or more inverters 104 to compensate for regional weather events (for example, power generation is controlled based on predicted weather events), and also evaluates power production issues due to such regional weather events (for example, power production issues may be attributed to weather events rather than system issues that require sending an employee to perform maintenance or repair).

In order to suitably control power production from the arrays 150 during weather events, e.g., to meet power ramp-down and ramp-up rates (as required by the utility companies), the DG master controller 118 predicts the occurrence of weather events on one or more arrays 150 as well as a corresponding impact on the power production. Generally the weather events are predicted at least 6-10 minutes ahead of time, although they may be predicted with more or less lead time. The DG master controller 118 may receive utility-required ramp rates directly from the utility (e.g., via the communications network 114); in some embodiments, the ramp rates may be configured via an administration interface.

In some embodiments, the DG master controller 118 predicts potential array-impacting weather events by comparing how one or more sub-arrays 101/arrays 150 perform versus neighboring sub-arrays 101/arrays 150. For example, the performance of arrays 150 may be compared to one another to identify a weather event impacting one or more arrays 150 and having a potential to impact other arrays 150. The performance of sub-arrays 101 may also be compared to one another (e.g., within a single array 150 or among various arrays 150) to identify a weather event impacting one or more sub-arrays 101 and having a potential to impact other sub-arrays 101. In some embodiments, performance of subsets of components within a sub-array 101 may be compared to identify a weather event and predict its impact on other portions of the sub-array 101; for example, performance of each inverter 104 may be compared, or the performance of small groups of inverters 104 may be compared. In general, any granularity of components within the arrays 150 may be compared to one another to determine a weather event and predict its impact among the arrays 150.

As part of generating the weather prediction by comparing power generation performance, the DG master controller 118 may use inputs such as current energy production from sub-arrays 101/arrays 150; expected energy production from sub-arrays 101/arrays 150; geographic location (e.g., certain geographical areas may have fairly stable and predictable weather patterns, such as cloud coverage during time of day/month, wind direction and speed, and the like); distance between sub-arrays 101/arrays 150; cloud parameters such as size, shape, speed and/or density (actual and/or predicted); and the like. Based on such information, the DG master controller 118 may then correlate the weather impacts on neighboring sub-arrays 101/arrays 150 to determine if a weather event is headed toward one or more sub-arrays 101/arrays 150, as well as to determine a predicted timeframe for the weather event to arrive. As such, neighboring PV systems are used as relative irradiance sensors to predict the occurrence of a weather event that may impact another portion of the system 100, where the neighboring PV systems and the potentially impacted portion of the system 100 may each belong to different owners.

In some alternative embodiments, the DG master controller 118 may use a previously generated prediction map/algorithm in addition to or instead of performing correlation based on an occurring weather event. Such prediction map/algorithm may be generated using sensors (e.g., weather sensors such as cloud sensors), pattern recognition and the like to view weather events over time for generating a map/algorithm that predicts shading patterns over time (e.g., shading patterns expected for various days/weeks/month of the year for various geographical locations). The DG master controller 118 may generate such a prediction map/algorithm itself based on collected data or may use a prediction map/algorithm obtained externally (e.g., predicted weather pattern maps may be obtained by the DG master controller 118 from known online weather prediction websites via the Internet).

Once a predicted weather event is determined, the DG master controller 118 predicts what the resulting power production impact would be (e.g., how much power production drops and how fast, how long the reduction lasts, and the like) and then controls power output from one or more arrays 150 (e.g., from one or more inverters 104) to compensate for the predicted power production impact. For example, in addition to decreased irradiance that would be experienced by an array 150 once shaded by a cloud, the array 150 may experience an increase in irradiance levels when the cloud is approaching/leaving the array 150 due to reflected energy from the cloud; such "cloud enhancement" may be very pronounced as the cloud leaves the array due to the temperature cooling of the PV modules 102 while they are shaded. In some embodiments, the controllers 106 may provide information to the DG master controller 118 (e.g., on the order of every second) indicating current power production from the corresponding sub-array 101, as well as full power production potential, spinning reserve, and the like. The DG master controller 118 may then track currently available power as well as potentially available power for use in determining predicted power impact from weather events and corresponding compensation.

In order to compensate as needed for predicted weather impacts, the DG master controller 118 issues control commands to the inverters 104 via the corresponding controllers 106 in order to control various power parameters. Such power parameters may include total power level generated by one or more arrays 150 (e.g., by one or more inverters 104) as well as the rate of ramping up or ramping down power generated by the arrays 150. As such, power level transitions that would occur due to weather events can be controlled to meet required levels (e.g., ramp-up and ramp-down requirements of 10% of full power production per minute as required by utilities). For example, the power ramp-down rate resulting from a cloud shading an array 150 is controlled to remain within required levels, and once the cloud passes power production can be ramped-up as rapidly as possible while still meeting required ramp-up rates.

The DG master controller 118 generally performs the predictions and evaluations described herein in real-time or in near real-time (e.g., sub-second or within seconds) and may update some or all of its models, algorithms and predictions in real-time or near real-time (e.g., a prediction may be updated based on information received from the arrays 150 indicating an unexpected change in a weather pattern or other operating conditions). As such, the DG master controller 118 may continuously receive updated data, evaluate occurring and predicted power changes for the arrays 150, and communicate updated control commands accordingly. For example, after sending control commands to one or more arrays 150 to ramp down power production based on a predicted cloud coverage, the DG master controller 118 may continue to receive and evaluate data to determine whether the predicted cloud coverage occurs or is still likely to occur, where such data may be received from one or more sensors or arrays 150 (e.g., data may be received indicating a change in wind direction or that a previously existing cloud has dissipated). The DG master controller 118 may then send updated commands based on such continuous real-time evaluation (for example, the DG master controller 118 may continuously evaluate power ramp-up or ramp-down rates and adjust power generation accordingly in real-time to control such rates).

In certain embodiments, the DG master controller 118 may "learn" relationships between one or more sensors (e.g., weather sensors) and the arrays 150. The DG master controller 118 may then adjust one or more models, algorithms, and/or predictions based on the learned relationships.

A storage system 120 (e.g., for storing energy in batteries and subsequently using such stored energy) is optionally coupled to the grid 110 for storing generated energy or coupling power to the grid 100 as needed to compensate for a drop in power production from the arrays 150 and/or to absorb excessive power production from the arrays 150. Power generation and storage by the storage system 120 may be controlled by the DG master controller 118 via the communications network 114.

In some alternative embodiments, one or more sub-arrays 101 may contain other types of renewable energy sources in addition to or in place of the PV modules 102, such as wind turbines, and suitable techniques are used to predict weather or other types of events impacting power production for the renewable energy sources (such as predicted wind changes) and to control array power output accordingly.

Figure 2:
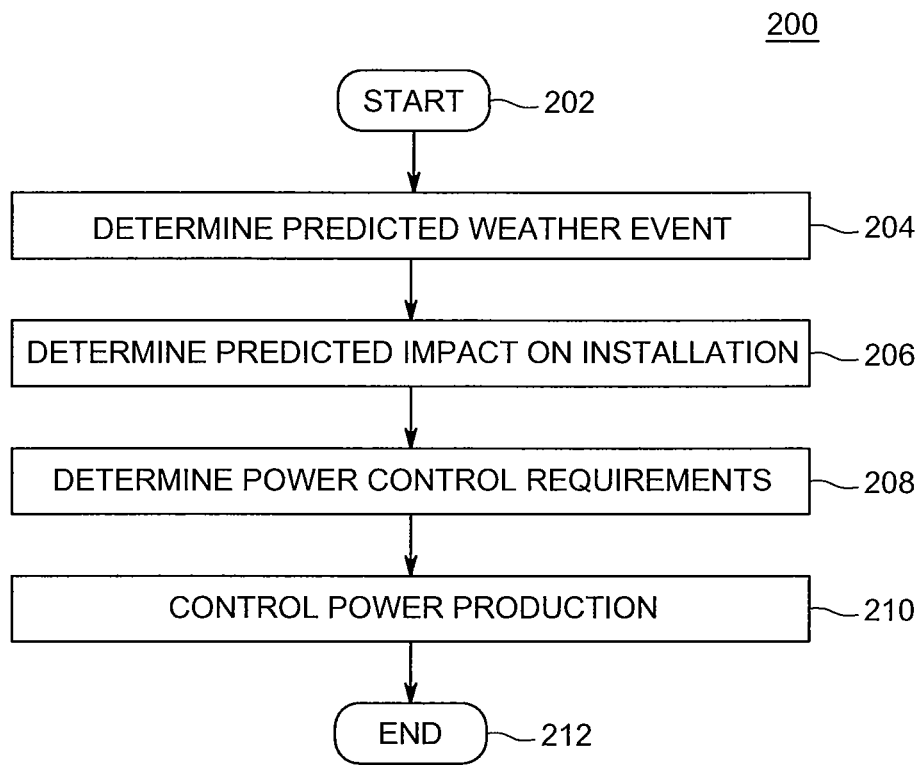
FIG. 2 is a block diagram of a method for controlling power production in accordance with one or more embodiments of the present invention.

FIG. 2 is a block diagram of a method 200 for controlling power production in accordance with one or more embodiments of the present invention. The method 200 may be used for power control in a system comprising distributed generators (DGs), such as the system 100.

The method 200 starts at step 202 and proceeds to step 204. At step 204, a predicted weather event for an operating array (e.g., an array 150 operating at 100% of capacity), sub-array, or one or more array components is determined. For example, cloud coverage is predicted to occur in ten minutes over a particular array 150. The weather event may be predicted as previously described with respect to FIG. 1.

At step 206, the power impact of the predicted weather event is determined. The power impact may be predicted as previously described with respect to FIG. 1. For example, power output expected from an array 150 once anticipated cloud coverage arrives is predicted (e.g., it is predicted that the array 150 will generate 20% of its full power output capability once shaded by the cloud coverage). Additionally, how fast the power output is expected to change and how long the power degradation will last may also be predicted.

The method 200 proceeds to step 208, where power control requirements are determined based on the predicted power impact of the predicted weather event. The power control requirements may be determined as previously described with respect to FIG. 1. The power control requirements may include rates of ramp-up and ramp-down needed to control power production within required limits; compensating for power loss expected from the predicted weather event, and the like. In some embodiments, compensation for expected power loss may be done using stored energy (e.g., via the storage systems 120). Additionally or alternatively, an "over-drive" mode may be used for providing such compensation.

The over-drive mode may be used in certain embodiments where the PV modules are over-dimensioned with respect to the corresponding inverters (for example, a 250 W inverter may be used with a 320 W PV module). In such embodiments, the inverters generally "flat-top" during a few hours of the day and during such times it is possible to extract more energy from the corresponding PV modules. The over-drive mode consists of allowing the inverters to go over its rated power for short periods of time (e.g., 4 hours) and while its operating temperature is below a predetermined threshold (e.g., 60 C). During the over-drive mode, wiring capacity must be managed at all times so that protection systems (e.g., AC breakers) are not triggered during that time. This may be accomplished by keeping track of the installation wiring diagram. In some embodiments, this may be done at installation by flipping the lowest level of breakers on one by one so that the map can be drawn automatically. The location of the breakers and their current capacity may be recorded, for example, on a mobile app or array gun.

During the over-drive mode, the installation can never exceed its rated power, and therefore the over-drive mode is only feasible when parts of the array are running below the rating of the inverter due, for instance, to clouds. Further, the over-drive mode is only applicable in "behind the fence" installations not accessible to the general public as it would otherwise violate the UL standard.

Real-time data may be obtained and used as part of determining the power control requirements; for example, current power generated by each of the sub-arrays 101 may be obtained and used in determining power loss compensation to be obtained by over-driving one or more inverters 104.

At 210, power production from the arrays 150 is controlled based on the requirements determined at step 208. The power production may be controlled as described above with respect to FIG. 1. As previously described, power production may be controlled iteratively, where real-time or near real-time data (e.g., from one or more sub-arrays 101, sensors, and the like) is continuously evaluated to determine changes in predicted weather events as well as corresponding changes to predicted power impacts and desired power compensation.

The DG master controller 118 issues the appropriate command and control instructions to the inverters 104 via their corresponding controllers 106. In order to provide real-time or near real-time power production control, a broadcast message may be sent to the inverters in one or more sub-arrays (via the corresponding controllers) for controlling their power production, for example indicating a maximum amount of power to be generated by each inverter.

In some embodiments, power production in a portion of inverters within an array may be adjusted so that those inverters remaining at full-power operation (i.e., one or more "golden" inverters may continually remain operating at full capacity) can provide data that is used (e.g., by the DG master controller 118) to determine the local irradiance and actual power available. Based on such data, it can be determined whether a predicted weather event actually occurred and whether the predicted weather event resulted in the expected impact on power generation. Power production control can then be updated accordingly. For example, during a period of power ramp-down, the rate of the ramp-down may be adjusted or the ramp-down may be aborted based on the updated data evaluation. Thus, by continually operating one or more golden inverters at full capacity, the resulting data may be used for appraising the capability of the system, for example for informing the next ramp-up/ramp-down step.

Generally, system performance is continuously reevaluated during ramp-up and ramp-down periods in order to determine whether to continue with the ramp-up or ramp-down, adjust the ramp rate, or abort the ramp-up or ramp-down. For example, an inbound cloud may be detected with an estimated impact of a 70% reduction in irradiance, and the appropriate ramp-down may begin. After some period of time it may then be determined that the clouding impact will be negligible, and the ramp-down can then be cancelled and ramp-up can begin to return to previous levels.

In one or more embodiments, power production control may be addressed to a portion of the inverters pseudorandomly. For example, a random identification number ("id") may be generated for and stored in each inverter, e.g., a CRC-type algorithm may be used to generate a random id between 0-99 for each inverter based on its serial number. To adjust power produced by approximately X % of inverters within a sub-array, a broadcast command may be sent to the sub-array indicating that those inverters having an id of "X" or less operate in a certain manner.

In addition to controlling the power produced by one or more inverters, power may be generated from storage systems (e.g., storage system 120) to compensate for lost power due to weather events, as well as to store excess energy generated as needed.

The method 200 then proceeds to step 212 where it ends.

In some embodiments, a computer readable medium comprises a program that, when executed by a processor, performs the method 200 described above.

Figure 3:
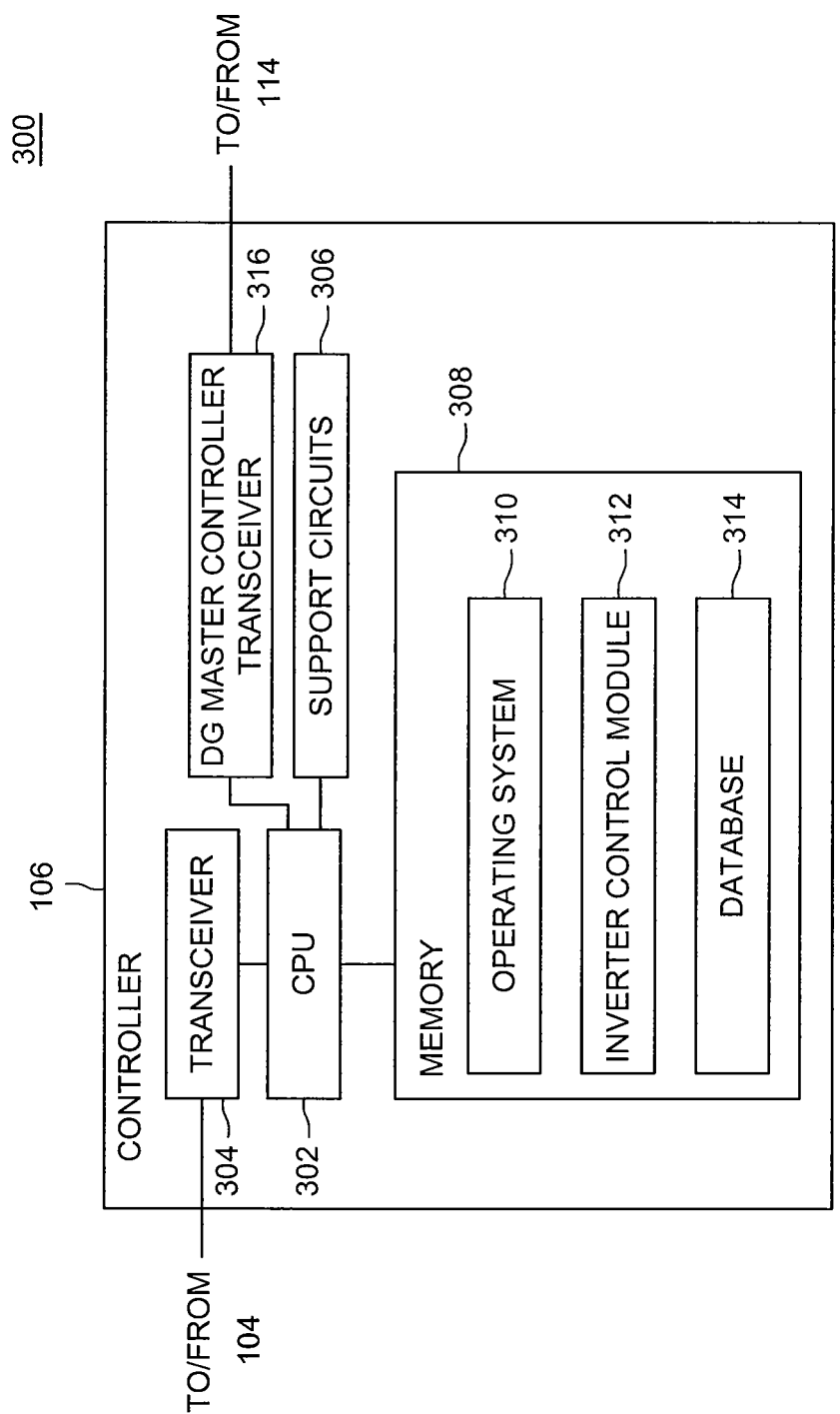
FIG. 3 is a block diagram of a controller in accordance with one or more embodiments of the present invention.

FIG. 3 is a block diagram of a controller 106 in accordance with one or more embodiments of the present invention. The controller 106 may be comprised of hardware, software, or a combination thereof, and may in certain embodiments comprise a central processing unit (CPU) 302 coupled to each of a transceiver 304, a DG master controller transceiver 316, support circuits 306 and a memory 308.

The transceiver 304 communicates with the inverters 104, for example to provide control instructions to the inverters 104 (e.g., instructions received from the DG master controller 118), to obtain data from the inverters 104 (e.g., performance data to be provided to the DG master controller 118), and the like.

The transceiver 304 may be coupled via power lines to the inverters 104 for communicating with the inverters 104 by power line communications (PLC). In some alternative embodiments, the transceiver 304 may communicate with the inverters 104 utilizing wireless and/or other types of wired communication techniques, for example a WI-FI or WI-MAX modem, 3G modem, cable modem, Digital Subscriber Line (DSL), fiber optic, or similar type of technology.

The DG master controller transceiver 316 communicatively couples the controller 106 to the DG master controller 118 via the communications network 114 (e.g., for providing data from the inverters 104 to the DG master controller 118, for receiving inverter control instructions from the DG master controller 118, and the like). The DG master controller transceiver 316 may utilize wireless and/or wired techniques, for example a WI-FI or WI-MAX modem, 3G modem, cable modem, Digital Subscriber Line (DSL), fiber optic, or similar type of technology, for coupling to the network 114 to provide such communication.

The CPU 302 may comprise one or more conventionally available microprocessors, microcontrollers and the like, which are capable of performing the processing described herein. In some embodiments the CPU 302 may be a microcontroller comprising internal memory for storing controller firmware that, when executed, provides the functionality described herein; alternatively, the CPU 302 may include one or more application specific integrated circuits (ASICs).

The support circuits 306 are well known circuits used to promote functionality of the CPU 302. Such circuits include, but are not limited to, a cache, power supplies, clock circuits, buses, network cards, input/output (I/O) circuits, and the like. The controller 106 may be implemented using a general purpose computer that, when executing particular software, becomes a specific purpose computer for performing various embodiments of the present invention.

The controller memory 308 may comprise random access memory, read only memory, removable disk memory, flash memory, and various combinations of these types of memory. The controller memory 308 is sometimes referred to as main memory and may, in part, be used as cache memory or buffer memory. The controller memory 308 generally stores the operating system (OS) 310 of the controller 106. The OS 310 may be one of a number of commercially available OSs such as, but not limited to, Linux, Real-Time Operating System (RTOS), and the like. The controller memory 308 may store various forms of application software, such as an inverter control module 312 for obtaining data from/providing control to the corresponding inverters 104 as described herein.

The memory 308 may additionally store a database 314 for storing data, such as data related to the present invention.

Figure 4:
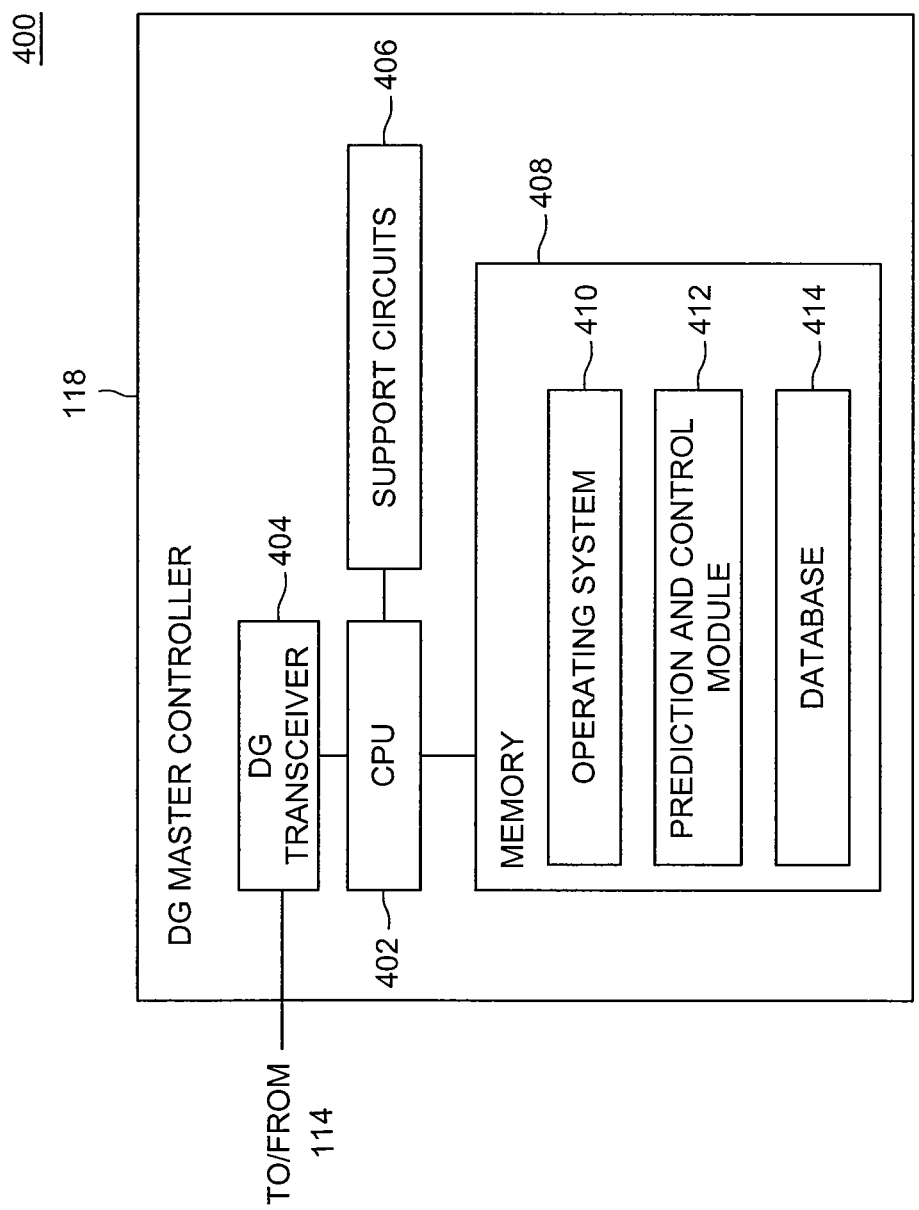
FIG. 4 is a block diagram of the DG master controller in accordance with one or more embodiments of the present invention.

FIG. 4 is a block diagram of the DG master controller 118 in accordance with one or more embodiments of the present invention.

The DG master controller 118 may be comprised of hardware, software, or a combination thereof, and comprises a central processing unit (CPU) 402 coupled to each of a DG transceiver 404, support circuits 406 and a memory 408. The DG transceiver 404 is communicatively coupled to each of the controllers 106 via the communications network 114 (e.g., via the Internet) for communicating with the sub-arrays 101 (e.g., for sending control commands to one or more of the sub-arrays 101, for receiving performance data from one or more of the sub-arrays 101, and the like). The DG transceiver 404 may utilize wireless and/or wired techniques, for example a WI-FI or WI-MAX modem, 3G modem, cable modem, Digital Subscriber Line (DSL), fiber optic, or similar type of technology, for coupling to the network 114 to provide such communication with the sub-arrays 101.

The CPU 402 may comprise one or more conventionally available microprocessors, microcontrollers and the like, which are capable of performing the processing described herein. In some embodiments the CPU 402 may be a microcontroller comprising internal memory for storing controller firmware that, when executed, provides the functionality described herein; alternatively, the CPU 402 may include one or more application specific integrated circuits (ASICs). The support circuits 406 are well-known circuits used to promote functionality of the CPU 402. Such circuits include, but are not limited to, a cache, power supplies, clock circuits, buses, network cards, input/output (I/O) circuits, and the like. The DG master controller 118 may be implemented using a general purpose computer that, when executing particular software, becomes a specific purpose computer for performing various embodiments of the present invention.

The DG master controller memory 408 may comprise random access memory, read only memory, removable disk memory, flash memory, and various combinations of these types of memory. The DG master controller memory 408 is sometimes referred to as main memory and may, in part, be used as cache memory or buffer memory. The DG master controller memory 408 generally stores the operating system (OS) 410 of the DG master controller 118. The OS 410 may be one of a number of commercially available OSs such as, but not limited to, Linux, Real-Time Operating System (RTOS), and the like. The DG master controller memory 408 may store various forms of application software, such as a prediction and control module 412 for obtaining data from/providing control to the arrays 150 and performing the functions described herein, such as obtaining data (e.g., from the arrays 150), obtaining utility-required ramp rates, determining predicted weather events and corresponding predicted power production impacts, determining DG control requirements to compensate for the predicted power production impacts, for providing control instructions to the arrays 150 (e.g., to one or more inverters 104), and the like. The method 200 described above is an implementation of the prediction and control module 412.

The DG master controller memory 408 may additionally store a database 414 for storing data, such as data related to the present invention (e.g., utility-required ramp rates).

Although techniques for controlling power production based on predicted weather events are described herein, similar techniques may be used for controlling power production based on other types of predicted events.

While the foregoing is directed to embodiments of the present invention, other and further embodiments of the invention may be devised without departing from the basic scope thereof, and the scope thereof is determined by the claims that follow.

The invention claimed is:

1. A method for controlling power production, comprising:
   obtaining a prediction of a weather event;
   determining, by a distributed generator (DG) master controller communicatively coupled to a DG array, a predicted power production impact for the DG array based on the prediction of the weather event; and
   communicating control commands from the DG master controller over a communication network and directly to the DG array to control power production in one or more power converters of the DG array to compensate for the predicted power production impact,
   wherein controlling the power production comprises managing wiring capacity within the DG array to prevent circuit protection devices from triggering when operating in an over-drive mode, and
   wherein during the over-drive mode one or more power converters of the DG array are operated over their rated power levels for a time period in which the one or more power converters do not exceed a predetermined temperature.

2. The method of claim 1, wherein determining the predicted weather event comprises comparing power produced by one or more DG array components that are geographically proximate the DG array.

3. The method of claim 1, wherein determining the predicted weather event comprises using at least one of a previously generated weather prediction map or a previously generated weather prediction algorithm.

4. The method of claim 1, wherein the one or more power converters of the DG array are operated over their rated power levels for about 4 hours, and
   wherein the predetermined temperature is about 60° C.

5. The method of claim 1, wherein determining the predicted power production impact comprises determining a predicted amount of power reduction by the DG array and a predicted rate of the power reduction.

6. The method of claim 5, wherein controlling the power production comprises reducing the power production at a controlled rate based on the predicted amount of the power reduction and the predicted rate of the power reduction.

7. The method of claim 6, wherein determining the predicted power production impact further comprises predicting a rate of power increase, subsequent to the power reduction, by the DG array, and
   wherein controlling the power production comprises increasing the power production at a second controlled rate based on the predicted rate of the power increase.

8. An apparatus for controlling power production, comprising:
   a distributed generator (DG) master controller for (i) determining a predicted weather event; (ii) determining a predicted power production impact for a distributed generator (DG) array based on the predicted weather event; and (iii) communicating control commands from the DG master controller over a communication network and directly to the DG array to control power production in one or more power converters of the DG array to compensate for the predicted power production impact,
   wherein controlling the power production comprises managing wiring capacity within the DG array to prevent circuit protection devices from triggering when operating in an over-drive mode, and
   wherein during the over-drive mode one or more power converters of the DG array are operated over their rated power levels for a time period in which the one or more power converters do not exceed a predetermined temperature.

9. The apparatus of claim 8, wherein determining the predicted weather event comprises comparing power produced by one or more DG array components that are geographically proximate the DG array.

10. The apparatus of claim 8, wherein determining the predicted weather event comprises using at least one of a previously generated weather prediction map or a previously generated weather prediction algorithm.

11. The apparatus of claim 8, wherein the one or more power converters of the DG array are operated over their rated power levels for about 4 hours, and
    wherein the predetermined temperature is about 60° C.

12. The apparatus of claim 8, wherein determining the predicted power production impact comprises determining a predicted amount of power reduction by the DG array and a predicted rate of the power reduction.

13. The apparatus of claim 12, wherein controlling the power production comprises reducing the power production at a controlled rate based on the predicted amount of the power reduction and the predicted rate of the power reduction.

14. The apparatus of claim 13, wherein determining the predicted power production impact further comprises predicting a rate of power increase, subsequent to the power reduction, by the DG array, and wherein controlling the power production comprises increasing the power production at a second controlled rate based on the predicted rate of the power increase.

15. A system for controlling power production, comprising:
- a distributed generator (DG) sub-array comprising (a) a controller, (b) a plurality of power converters communicatively coupled to the controller, and (c) a plurality of renewable energy sources, wherein the plurality of renewable energy sources and the plurality of power converters are coupled in a one-to-one correspondence; and
- a distributed generator (DG) master controller, communicatively coupled to the DG sub-array, for (i) determining a predicted weather event; (ii) determining a predicted power production impact for the DG sub-array based on the predicted weather event; and (iii) communicating control commands from the DG master controller over a communication network and directly to the DG array to control power production in one or more power converters of the DG array to compensate for the predicted power production impact, wherein controlling the power production comprises managing wiring capacity within the DG array to prevent circuit protection devices from triggering when operating in an over-drive mode, and wherein during the over-drive mode one or more power converters of the DG array are operated over their rated power levels for a time period in which the one or more power converters do not exceed a predetermined temperature.

16. The system of claim 15, wherein determining the predicted weather event comprises comparing power produced by one or more DG array components that are geographically proximate the DG sub-array.

17. The system of claim 15, wherein determining the predicted weather event comprises using at least one of a previously generated weather prediction map or a previously generated weather prediction algorithm, and wherein the previously generated weather prediction map and the previously generated weather prediction algorithm each predicts shading patterns over time.

18. The system of claim 15, wherein determining the predicted power production impact comprises determining a predicted amount of power reduction by the DG array and a predicted rate of the power reduction, and wherein controlling the power production comprises reducing the power production at a controlled rate based on the predicted amount of the power reduction and the predicted rate of the power reduction.

19. The system of claim 18, wherein determining the predicted power production impact further comprises predicting a rate of power increase, subsequent to the power reduction, by the DG array, and wherein controlling the power production comprises increasing the power production at a second controlled rate based on the predicted rate of the power increase.

20. The system of claim 15, wherein the one or more power converters of the DG array are operated over their rated power levels for about 4 hours, and wherein the predetermined temperature is about 60° C.

* * * * *